Dec. 26, 1967  L. H. HADDE  3,360,628
INDUCTOR FOR AN INDUCTION HEATING APPARATUS
Filed March 11, 1965  4 Sheets-Sheet 4

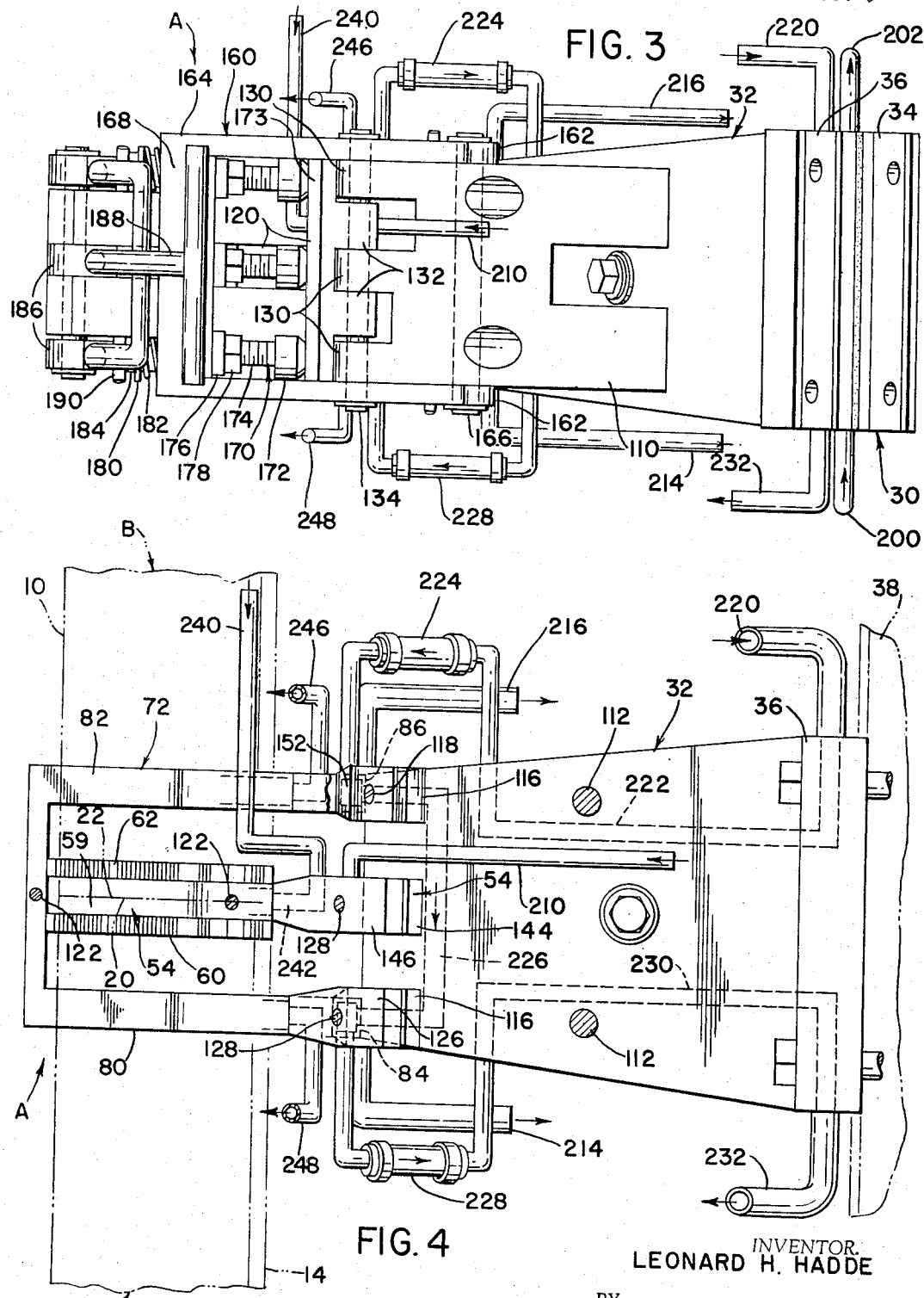

INVENTOR.
LEONARD H. HADDE
BY Tilberry & Body
ATTORNEYS

United States Patent Office 3,360,628
Patented Dec. 26, 1967

3,360,628
INDUCTOR FOR AN INDUCTION HEATING APPARATUS
Leonard H. Hadde, Cleveland, Ohio, assignor to The Ohio Crankshaft Company, Cleveland, Ohio, a corporation of Ohio
Filed Mar. 11, 1965, Ser. No. 438,962
13 Claims. (Cl. 219—10.79)

ABSTRACT OF THE DISCLOSURE

There is provided an inductor for heating a generally T-shaped workpiece with a base and an upstanding leg. The inductor includes a main conductor generally encircling the workpiece and terminating at spaced ends adjacent the outer edge of the workpiece leg. A pair of auxiliary, or return, conductors branch out from each of the spaced ends of the main conductor and, in turn, encircle half of the workpiece on opposite sides of the main conductor to assure concentration of heating adjacent the main conductor.

---

The present invention pertains to the art of induction heating and more particularly to an improved inductor for an induction heating apparatus.

The invention is particularly applicable for use as an inductor to heat the abutting ends of two elongated workpieces having T-shaped cross-sections, preparatory to butt welding these workpieces together for use as the support beams of an overhead crane, and it will be described with particular reference thereto; however, it will be appreciated that the invention has much broader applications and may be used as an inductor to heat various elongated workpieces for many different purposes.

When installing an overhead crane, it has become somewhat common practice to provide a T-shaped, or I-shaped, beam traversing the floor area to be serviced by the crane. When this floor area is quite large, a standard length beam is not long enough to completely cover the area. Consequently, it is often necessary to butt weld two or more of these standard length beams together to produce a single beam having sufficient length to cover the floor area. In the past, it was suggested to butt weld these beams by arc welding the beams together at the location where they were to be used. However, this welding operation was not successful because the beams are generally formed from high carbon steel which is not successfully joined by arc welding without problems of brittleness. To overcome this difficulty it was suggested to use induction heating apparatus for butt welding the beams together. Although the induction welding process is well adapted for welding the high carbon steels used in forming the beams, the process was not adapted by the trade because there was no heating inductor which could produce an even heating pattern within the abutting ends of the beams before they were welded together. Without an even heating pattern, the butt welded seams were not uniform, nor were they sufficiently strong to support the overhead crane.

These and other disadvantages of prior attempts to butt weld the beams for supporting an overhead crane, or similar beams, have been completely overcome by the present invention which is directed toward an improved inductor which can produce a uniform heating pattern within the abutting ends of a T-shaped beam, or an I-shaped beam.

In accordance with the present invention, there is provided an inductor for heating a selected narrow portion along the length of an elongated workpiece having a cross-section including an upstanding leg with a first and second end and an outwardly extending element adjacent the first end of the upstanding leg. This inductor comprises a main conductor having an internal contour generally matching the cross-section of the workpiece and two terminal ends positioned on opposite sides of the upstanding leg and adjacent the second end of this leg. There is also provided a pair of return conductors fixedly connected onto each terminal end of the main conductor, these return conductors each have an internal contour generally matching at least a portion of the cross-section of the work-piece, each pair of return conductors are positioned on opposite sides of the workpiece with the return conductors of each pair being on opposite sides of the main conductor.

By providing an inductor as defined above, the main conductor produces an even heating pattern within the workpiece with the symmetrically positioned return conductors providing an even flux pattern in the main conductor.

In accordance with another aspect of the present invention, at least the return conductors forming one pair of return conductors and the main conductor are divided at a given point into two sectors with electrical contacts joining the sectors, and means for releasably holding the sectors fixedly with respect to each other and with the contacts of the sectors abutting each other.

In accordance with the above aspect of the present invention, a portion of the return conductors and a portion of the main conductor can be pivoted from their operating positions to allow transverse entry and exit of the workpiece with respect to the inductor. This is extremely important in the case of butt welding extremely long workpieces, such as the beams used for supporting an overhead crane, since such welded beams may be 100 feet to 120 feet in length and cannot be conveniently removed from the inductor in an axial direction without requiring a considerably increased working area and/or without damaging the inductor.

The primary object of the present invention is the provision of an inductor for heating a narrow band on an elongated workpiece having a T-shaped cross-section, or another similar cross-section, which inductor produces a uniform heating pattern within the workpiece.

Another object of the present invention is the provision of an inductor for heating a narrow band on an elongated workpiece having a T-shaped cross-section, or another similar cross-section, which inductor allows transverse entry and exit of the elongated workpiece.

Still another object of the present invention is the provision of an inductor for heating a narrow band on an elongated workpiece having a T-shaped cross-section, or another similar cross-section, which inductor has a pivoted portion to allow transverse entry and exit of the elongated workpiece.

Yet another object of the present invention is the provision of an inductor for heating a narrow band on an elongated workpiece having a T-shaped cross-section, or another similar cross-section, which inductor has a main conductor and two pairs of return conductors with the return conductors being symmetrically arranged with respect to the main conductor and the workpiece.

Another object of the present invention is the provision of an inductor for heating the abutting ends of adjacent, elongated workpiece each having a T-shaped cross-section, or another similar cross-section, which inductor produces a uniform heating pattern within the ends of the workpiece.

These and other objects and advantages will become apparent from the following description used to illustrate a preferred embodiment of the invention as read in connection with the accompanying drawings in which:

FIGURE 3 is a bottom view taken generally along line 3—3 of FIGURE 2;

FIGURE 4 is a partially cut away, bottom view taken generally along line 4—4 of FIGURE 2;

Figure 2:
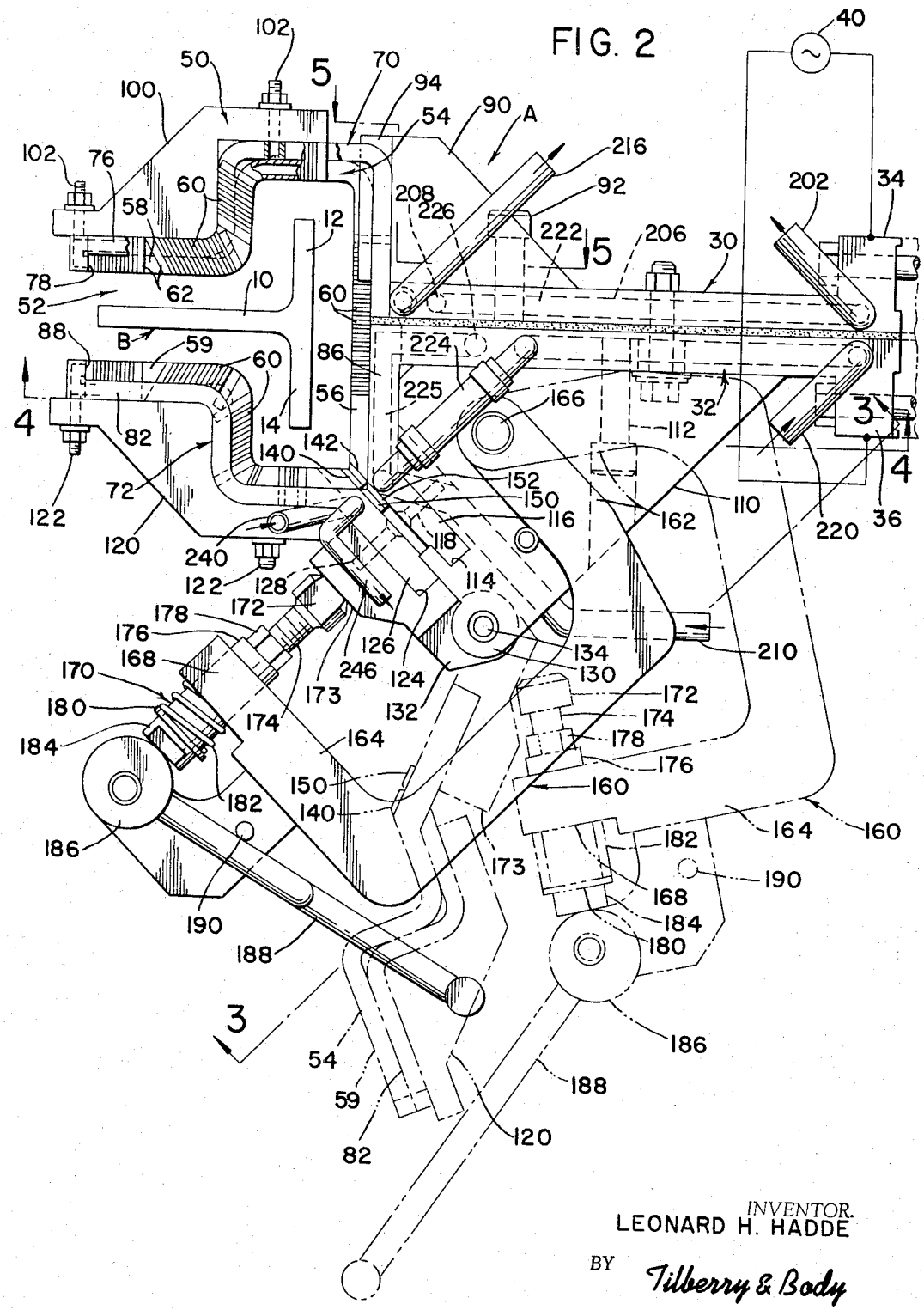
FIGURE 2 is an end view of the preferred embodiment of the invention illustrating, in phantom lines, the loading and unloading position of the inductor.

Referring now to the drawings wherein the showings are for the purpose of illustrating a preferred embodiment of the invention only and not for the purpose of limiting same, the figures show an induction heating apparatus A utilized for heating elongated workpiece B. In accordance with the illustrated embodiment of the invention, the workpiece B, as shown in FIGURE 2, has a T-shaped cross-section with an upstanding leg 10 and two outwardly extending legs 12, 14. The workpiece B may be a single elongated member or, as shown in phantom lines in FIGURE 4, it may consist of two elongated workpieces B, C with abutting ends 20, 22, respectively. Apparatus A is equally useful for heating a narrow band along the length of a single workpiece or for heating the abutting ends of two separate workpieces; however, for the purpose of the following discusion, only a single workpiece B will be discussed.

Referring now in more detail to apparatus A, the apparatus includes a pair of bus members 30, 32 having, at one end thereof, connecting flanges 34, 36, respectively. As shown in FIGURE 4, the connecting flanges 34, 36 are fixedly secured onto an appropriate support structure 38, shown in phantom lines. To introduce electrical energy across bus members 30, 32, there is provided a high frequency power source, schematically represented as generator 40 in FIGURES 2 and 6. Electrically connected onto the other ends of bus members 30, 32 is an inductor 50, which includes the primary features of the present invention.

Referring now more specifically to inductor 50, the inductor has an internal, workpiece receiving passage 52. The internal contour of this passage is slightly larger than the periphery of workpiece B. The amount of spacing between the periphery of workpiece B and the inductor 50 is determined by known electrical principles. The internal passage 52 is determined primarily by a main conductor 54 having a lower loop portion 56 and spaced terminal ends 58, 59. Along the length of the main conductor 54 there are provided a plurality of lamination stacks 60 secured onto the conductor by spaced shields 62. Two separate pairs—70, 72—of return conductors electrically connect the terminal ends 58, 59, respectively, of the inductor onto the bus members 30, 32, respectively.

Referring now, in more detail, to the pair 70 of return conductors, this pair includes conductors 74, 76 having internal contours generally matching the peripheral shape of the workpiece B; however, as in the case of the main conductor 54, the internal contours of the return conductors are larger than the workpiece B. In fact, the return conductors 74, 76 are offset, as is designated by numeral 78, in an outward direction so that the internal contours of the return conductors is larger than the internal contour of the main conductor 54. In this manner, the return conductors are spaced further from the workpiece than the main conductor and the main conductor forms the primary induction heating element of inductor 50.

The pair 72 of return conductors includes conductors 80, 82 which are quite similar to conductors 74, 76; however, the conductors 80, 82 terminate in conductor extensions 84, 86, respectively. As was explained in connection with conductors 74, 76, the internal contour, defined by conductors 80, 82 and their extensions 84, 86, is offset from the internal contour of the main conductor 54, as designated by numeral 88. In this manner, the return conductors in pair 72 do not form primary heating elements of the inductor 50.

Figures 5, 6:
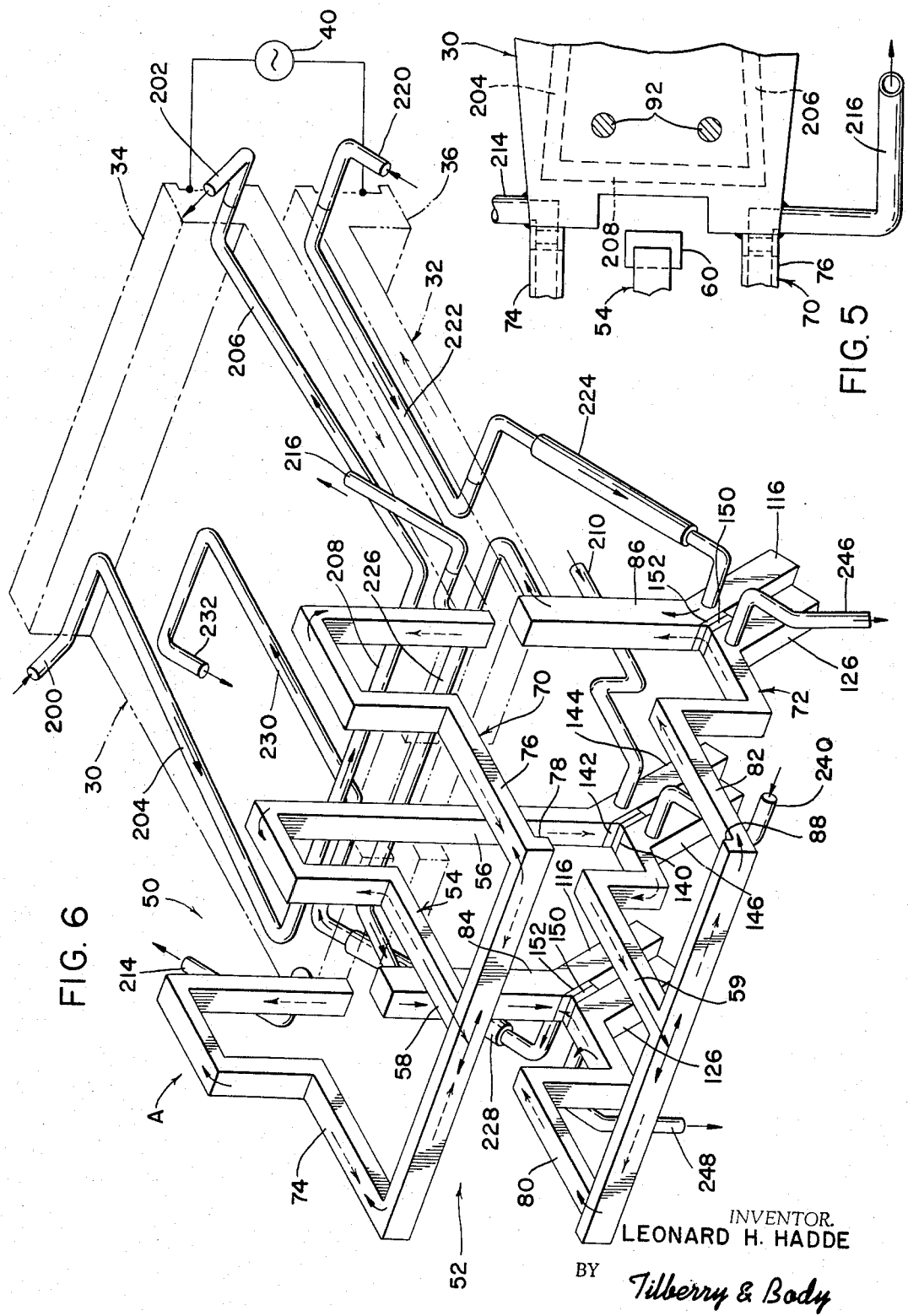
FIGURE 5 is a partial view taken generally along line 5—5 of FIGURE 2.
FIGURE 6 is a schematic view illustrating the conductors and coolant conduits of the preferred embodiment of the present invention; and, FIGURES 7 and 8 are partial, cross-sectioned views illustrating, in more detail, an aspect of the present invention.

Referring now to FIGURE 6, when the generator 40 is energized, current flows through inductor 50 in accordance with the dash lined arrows. The current flow within the main conductor 54 is approximately twice the current flow in the return conductor; therefore, a greater amount of magnetic flux is created around the main conductor. This greater amount of flux, coupled with the closer proximity of the main conductor to the workpiece, assures that primary heating of the workpiece is effected by the main conductor 54. Since the return conductors are positioned on opposite sides of the main conductor 54, they create a symmetrical heating pattern within the workpiece and directly opposite to the main conductor. This is substantially different from an arrangement wherein a single return conductor is positioned on one side, or the other, of the main conductor. With such an arrangement the heating pattern would be offset from the main conductor and the return conductor would handle the same current as the main conductor. In accordance with known principles, the lamination stacks 60 also assist in concentrating the heating flux in the area of the workpiece B directly opposite the main conductor. This particular arrangement of the conductors within the inductor 50 has proven highly efficient in heating a small band along the length of an elongated workpiece, such as workpiece B.

Figure 1:
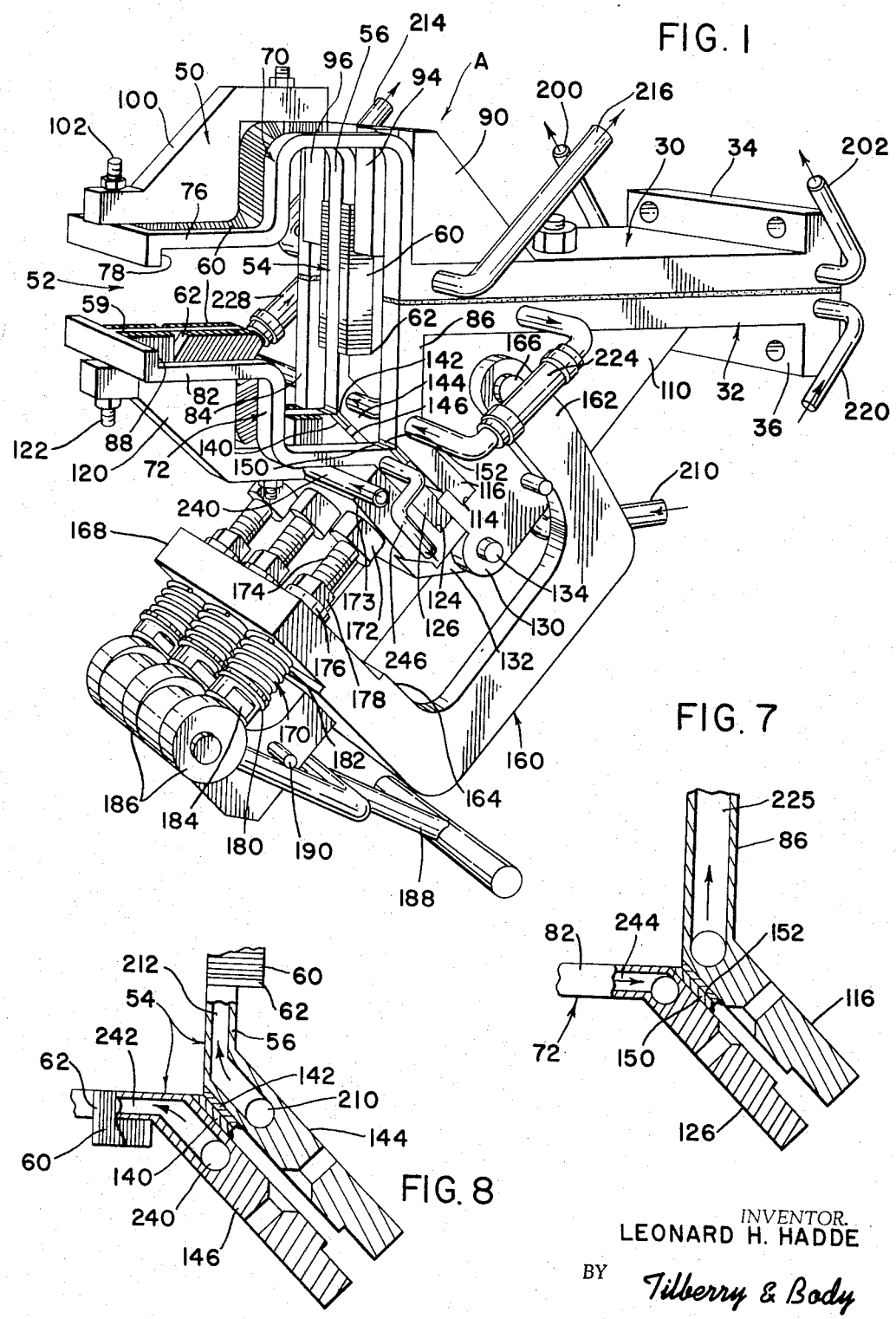
FIGURE 1 is a pictorial view illustrating the preferred embodiment of the present invention.

In accordance with the illustrated embodiment of the present invention, the inductor 50 is provided with an appropriate insulating and supporting structure. This structure includes an insulation block 90 attached by bolt 92 onto the upper portion of bus member 30. The block 90 includes bosses 94, 96 which extend between the conductors, 74, 54 and 76 to insulate mutually these conductors. Another insulating block 100 is secured by bolt 102 onto the outer surface of the main conductor 54, as best shown in FIGURES 1 and 2. This insulation block 100 not only forms a support member for the inductor, but also, prevents damage from external blows to the inductor 50. A further insulating block 110 is secured onto the lower surface of bus member 32 by one or more bolts 112. This particular block includes a recess 114 for receiving mounting brackets 116, 144 and 116 of conductor extensions 84, 56 and 86, respectively. For simplicity, only one of the brackets 116 is illustrated. The mounting brackets 116 are secured within recess 114 by a plurality of appropriately positioned bolts 118 (see FIGURE 2). The last insulating block forming the support structure for inductor 50 is block 120 which is secured onto the inductor 50 by a plurality of bolts 122. Block 120 includes a recess 124 for receiving mounting brackets 126, 146 and 126 of conductors 80, 59 and 82, respectively. For simplicity, only one of the mounting brackets is illustrated. To secure the brackets 126 onto the block 120, there is provided a plurality of bolts 128 as is best shown in FIGURE 2.

In accordance with the present invention, the inductor 50 is provided with a structure for opening one side of the inductor to allow transverse entry and exit of the workpiece B from the workpiece receiving passage 52. The block 110 is provided with a plurality of outwardly extending hinge lugs 130 which coact with similar hinge lugs 132 on block 120 to mount block 120 pivotally with respect to block 110. The block 120 pivots around pin 134.

The main conductor 54, as shown in FIGURE 8, is provided with separable, electrical contacts 140, 142 which, in effect, divide the main conductor into two sectors. Brackets 144, 146, extending downwardly from each of the main conductor sectors, are adapted to be secured onto blocks 110, 112, respectively, so that the main conductor sector, including terminal end 59, is pivoted with respect to the other main conductor sector as block 120 is pivoted with respect to block 110.

Electrical contacts 150, 152 are provided between conductors 80, 82 and their respective extensions 84, 86. Since the conductors 80, 82 are secured onto block 120, pivoting of the block 120 separates contacts 150, 152 and moves the conductors 80, 82 away from their extensions. In this manner, the return conductors and main conductor sector on one side of the inductor 50 can be pivoted to allow convenient, transverse feeding and removal of an elongated workpiece with respect to the workpiece receiving passage 52. In essence, the contacts 140, 142 and 150, 152 are aligned in a direction axial of the workpiece. This facilitates the pivotal movement of the movable portion of the inductor. Also, the contacts are located adjacent the edge of workpiece B defined by the end of flange 14 so that a sufficient portion of the inductor is movable to allow feeding and removal of the workpiece.

To clamp the block 120 with respect to block 110, there is provided a clamping arrangement including a C-clamp 160 having bifurcated arms 162, 164. Arms 162 are pivotally mounted on a pin 166 protruding outwardly from both sides of the block 110. Adjacent the terminal end of arms 162 there is provided a clamping plate 168 which is adapted to receive a plurality of clamp rods 170. Since all of these clamp rods are substantially the same, only one will be described in detail and this description will apply equally to the remaining clamp rods. Each of the clamp rods 170 includes a head 172 adapted to bear against a portion 173 of block 120. Head 172 is supported on the end of a threaded shank 174 received within a sleeve 176 and secured with respect to the sleeve by a lock nut 178. On the outboard side of plate 168, sleeve 176 includes a shoulder 180 for supporting a spring 182 between the shoulder and the clamp plate. The uppermost portion of clamp rod 170 is provided with a cam follower 184. Above each of the clamp rods 170 there is a cam 186 rotatable by a handle 188. The surfaces of these cams are contoured so that rotation of the cam forces the bearing heads 172 into clamping engagement with the portion 173 of block 120. To limit the pivoting action of handle 188, in one direction, there is provided a stop pin 190 which functions in a manner to be hereinafter described.

Referring now to FIGURE 2, the inductor is opened in the following manner. Handle 188 is rotated clockwise away from pin 190. This releases the bearing heads 172 from the portion 173. The C-clamp 160 can then be pivoted into the phantom line position shown in FIGURE 2. This releases block 120 so that it can be pivoted around pin 134. Thereafter, the workpiece B can be withdrawn or inserted within the inductor 50. When the workpiece is in place, the block 120 is then pivoted into a position shown in FIGURE 2 and the C-clamp 160 is moved into the solid line position. By rotating the handle 188 into a position abutting pin 190, the cams 186 force bearing head 172 into clamping engagement with portion 173 of block 120. This closes the contacts 140, 142 and 150, 152 so that electrical continuity is formed through the various conductors of the inductor 50. The pressure on the portion 173 is adjustable by rotating the shanks 174 with respect to sleeves 176. After the proper outwardly extended positions of heads 172 are obtained, the nuts 178 lock the heads 172 in this position. Pin 190 prevents further pivoted movement of the handle 188 in the counterclockwise direction and springs 182 prevent inadvertent rotation of the handle in the opposite direction. In this manner, the conductor is ready to inductively heat the portion of the workpiece B immediately opposite the main conductor 54. This mechanical arrangement provides a convenient structure for allowing transverse loading of the workpiece into the inductor.

Referring now to the cooling system for apparatus A, which is best shown in FIGURE 6, the bus member 30 is cooled by circulating a cooling fluid, such as water, from inlet 200 to outlet 202. The inlet and outlet are connected by longitudinal passageways 204, 206 and an intermediate transverse passageway 208.

The stationary portion of the inductor itself is cooled by a plurality of separate cooling systems. It is appreciated that the conductors forming inductor 50 have an internal coolant passageway in accordance with known practice. These coolant passages are combined with auxiliary passageways to provide cooling of the inductor 50. The first cooling system in the stationary portion of the inductor includes an inlet 210 which directs the cooling fluid into the main conductor passageway 212, as shown in FIGURE 8. From the main conductor passageway the fluid flows through return conductors 74, 76 and out dual outlets 214, 216. The other separate cooling system for the stationary portion of the inductor includes an inlet 220 which directs the cooling fluid into passageway 222 formed within lower bus member 32. From the passageway 222 the fluid flows through a shunt passage 224 into passage 225 in conductor extension 86, as shown in FIGURE 7. After flowing through the extension passageway, the cooling fluid flows through transverse passageway 226 to the opposite conductor extension 84. From this extension, the fluid flows through shunt passage 228 into passageway 230 formed in the lower bus member 32. Thereafter, the fluid flows from outlet 232. It is appreciated that the passageways 222, 226 and 230 also form the cooling system for the lower bus member 32. By utilizing the two separate cooling systems, it has been found that the lower bus member 32 and the stationary portion of inductor 50 are adequately cooled.

The movable portion of inductor 50 is cooled by a single cooling system. In accordance with the illustrated embodiment of the invention, this system includes an inlet 240 which directs a cooling fluid into the main conductor passageway 242, as shown in FIGURE 8. From this passageway, the cooling fluid flows through the return conductor passageways 244, shown in FIGURE 7, to outboard outlets 246, 248. It is appreciated that flexible conduits are connected onto inlet 240 and outlets 246, 248 so that the movable portion of the inductor may be shifted without interference from the coolant connections.

The present invention has been discussed in connection with certain structural embodiments; however, various changes may be made in these embodiments without departing from the intended spirit and scope of the present invention as defined by the appended claims.

Having thus described my invention, I claim:

1. An inductor for heating a selected narrow portion along the length of an elongated workpiece having a cross-section including an upstanding leg with a first end and a second end and an outwardly extending element adjacent said first end of said upstanding leg, said inductor comprising: a main conductor having an internal contour generally matching said cross-section and slightly larger than said cross-section, and two terminal ends positioned on opposite sides of said upstanding leg and adjacent said second end of said upstanding leg, a pair of return conductors fixedly connected onto each terminal end of said main conductor, said return conductors having an internal contour generally matching at least a portion of said cross-section and slightly larger than said portion of said cross-section, each pair of return conductors being positioned on opposite sides of said workpiece with the return conductors of each pair being on opposite sides of said main conductor.

2. An inductor as defined in claim 1 wherein said internal contours of said return conductors are slightly larger than the internal contour of said main conductor.

3. An inductor as defined in claim 1 wherein at least the return conductors in one pair of return conductors and said main conductor are each divided into two sectors with electrical contacts joining said sectors, and means for releasably holding said sectors fixedly with respect to each other and with said contacts of said sectors abutting each other.

4. An induction heating apparatus for heating a selected narrow portion along the length of an elongated workpiece having a generally T-shaped cross-section including an upstanding leg with a first and a second end and two outwardly extending legs adjacent said first end of said upstanding leg, said apparatus comprising: a pair of bus members, a high frequency power source electrically connected across said bus members, and an inductor, said inductor comprising a main conductor having an internal contour generally matching said cross-section and slightly larger than said cross-section, and two terminal ends positioned on opposite sides of said upstanding leg and adjacent said second end of said upstanding leg, a first pair of return conductors connected onto one of said terminal ends, said return conductors each having an internal contour generally matching said cross-section and slightly larger than said cross-section, said return conductors being on opposite sides of said main conductor and means for connecting said return conductors onto one of said bus members, and a second pair of return conductors connected onto the other of said terminal ends, said return conductors in said second pair each having an internal contour generally matching said cross-section and slightly larger than said cross-section, said return conductors in said second pair being on opposite sides of said main conductor and means for connecting said return conductors in said second pair onto the other of said bus members.

5. An induction heating apparatus as defined in claim 4 wherein said internal contours of said return conductors are slightly larger than the internal contour of said main conductor.

6. An induction heating apparatus as defined in claim 4 wherein said main conductor is formed from two separate sectors, with each sector including one of said terminal ends, an electrical contact on the end of each of said sectors opposite from said terminal ends and means for releasably holding said sectors fixedly with respect to each other and with said contacts of said sectors abutting each other.

7. An induction heating apparatus as defined in claim 6 wherein each of said return conductors in said second pair is formed from two separate sectors, with one of said sectors in each of said return conductors being fixedly connected onto said second bus member and the other of said sectors in each of said return conductors being fixedly connected onto one terminal end of said main conductor, said return conductor sectors each having a contact at the end opposite said fixedly connected ends and means for releasably holding said return conductor sectors fixedly with respect to each other and with said contacts of said sectors in each of said return conductors abutting each other.

8. An induction heating apparatus as defined in claim 7 wherein said contacts on said conductor sectors are mutually aligned in a direction generally axial of said elongated workpiece.

9. An induction heating apparatus as defined in claim 7 wherein each of said outwardly extending legs has an outermost end defining an edge, and said contacts on said conductors are adjacent the edge defined by one of said outwardly extending legs.

10. An induction heating apparatus for heating the abutting ends of two elongated workpieces each of which has a generally T-shaped cross-section including an upstanding leg with a first and a second end and two outwardly extending legs adjacent said first end of said upstanding legs of said workpieces, said apparatus comprising: a pair of bus members, a high frequency power source electrically connected across said bus members and an inductor, said inductor comprising a main conductor having an internal contour generally matching said cross-sections of said workpieces and slightly larger than said cross-sections, and two terminal ends positioned adjacent the second end of said upstanding legs, said terminal ends being spaced from each other, said main conductor being positioned adjacent the abutting ends of said workpieces, return conductors for connecting said main conductor onto said bus members, said main conductor being formed from two separate sectors, with each sector including one of said terminal ends, an electrical contact on the end of each of said sectors opposite from said terminal ends, and means for releasably holding said sectors fixedly with respect to each other and with said contacts of said sectors abutting each other.

11. An induction heating apparatus as defined in claim 10 wherein one of said return conductors is formed from two separate sectors, one of the return conductor sectors being fixedly connected onto one of said bus members and the other of said return conductor sectors being fixedly connected onto one terminal end of said main conductor, said return conductor sectors each having a contact at the end opposite said fixedly connected ends and means for releasably holding said return conductor sectors fixedly with respect to each other and with said contacts of said return conductor sectors abutting each other.

12. An induction heating apparatus as defined in claim 11 wherein said contacts on said conductor sectors are mutually aligned in a direction generally axial of said elongated workpiece.

13. An induction heating apparatus as defined in claim 11 wherein each of said outwardly extending legs has an outermost end defining an edge on said workpiece, and said contacts on said conductors are adjacent the aligned edges of said workpieces defined by abutting outwardly extending legs.

References Cited
UNITED STATES PATENTS 2,343,889  3/1944  Denneen et al. ___ 219—10.79 X
2,549,930  4/1951  Riegel et al. _____ 219—10.79 X RICHARD M. WOOD, *Primary Examiner.*

L. H. BENDER, *Assistant Examiner.*